April 12, 1966 F. I. LAVIGUEUR 3,245,653
TRUNNION MOUNTED BALL VALVE HAVING LOST MOTION AND POSITIVE
REDUCTION ACTUATING MEANS
Filed May 1, 1962 5 Sheets-Sheet 1

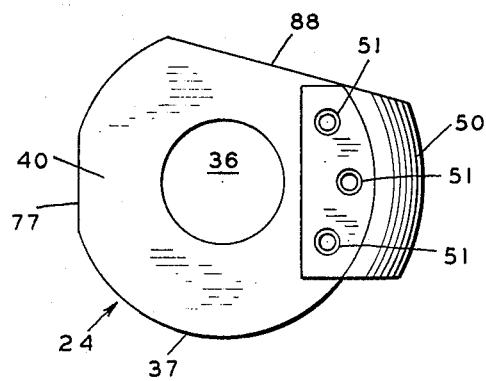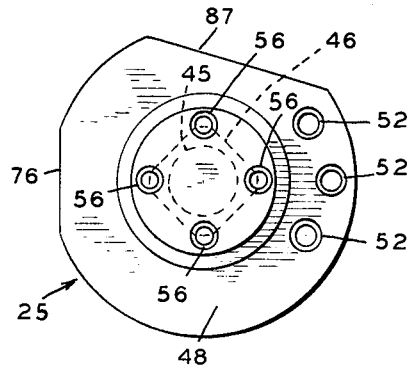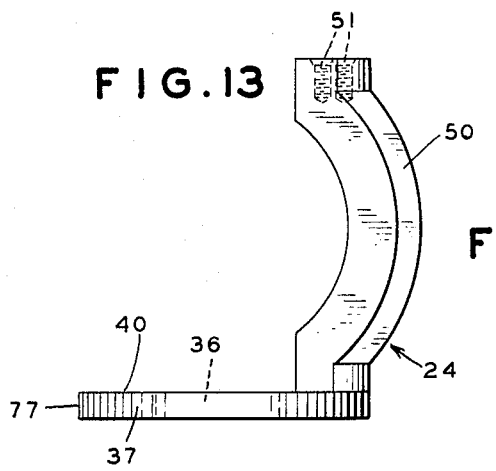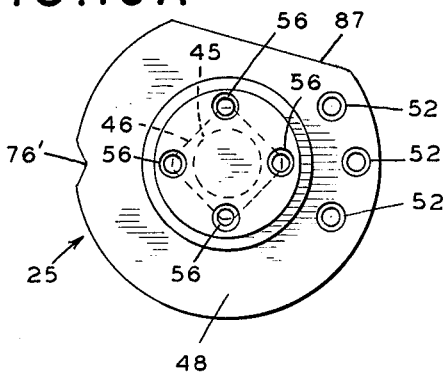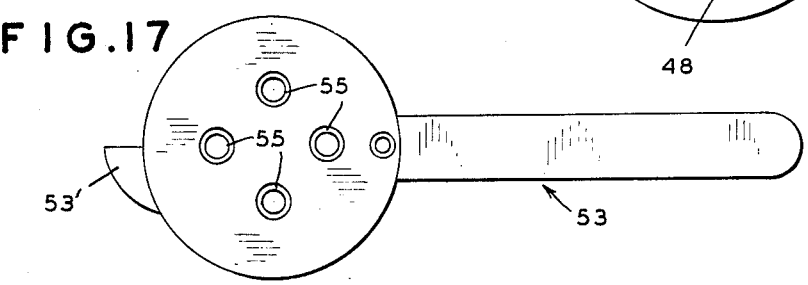

United States Patent Office 3,245,653
Patented Apr. 12, 1966

3,245,653
TRUNNION MOUNTED BALL VALVE HAVING LOST MOTION AND POSITIVE REDUCTION ACTUATING MEANS
Francois I. Lavigueur, Noank, Conn., assignor to General Dynamics Corporation, New York, N.Y., a corporation of Delaware
Filed May 1, 1962, Ser. No. 191,630
10 Claims. (Cl. 251—159)

The present invention relates to ball valves, and more particularly to trunnion mounted ball valves.

This is a continuation-in-part of copending United States patent application Serial No. 61,279, filed October 7, 1960, now Patent No. 3,164,362, granted January 5, 1965.

The principal object of the present invention has been to provide a novel and improved trunnion mounted ball valve construction, and in particular such a construction which is especially adapted for an all metal valve, i.e., a valve in which not only the ball and valve housing are made of metal but also the valve seat seal.

Another object of the invention has been to provide a trunnion mounted ball valve construction which is particularly adaptable for use under extreme conditions of pressure and temperature and for handling corrosive fluids.

Yet another object of the invention has been the provision of a trunnion mounted ball valve construction in which operating torque requirements are minimized and in which scoring, wearing and galling of the ball and seat are reduced or eliminated.

A further object of the invention has been the provision of a trunnion mounted ball valve construction in which damage due to cold welding between the ball and the seat is eliminated. By cold welding is meant the welding action which occurs between metal surfaces which are forced together under an impressed load and which, while under such load, are subjected to a tangential force urging one surface to move along the other; this is sometimes called the "interlock-weld theory." The avoidance of such cold welding is of great importance for an all metal valve construction intended to accommodate high fluid pressures and temperatures.

Another object of the invention has been the provision of a trunnion mounted ball valve construction in which the seal point or point of contact between the ball and the seat in the closed position is wiped clean before sealing occurs.

A further object of the invention has been the provision of a trunnion mounted ball valve construction in which the ball is maintained in a pressure balance such that the vertical alignment between the ball and the seat is not influenced by pressure in the valve.

Still another object of the invention has been the provision of a trunnion mounted ball valve construction in which fluid pressure forces acting on the seat with the valve fully or partially open are balanced.

Another object of the invention has been the provision of a top-loaded, all metal trunnion mounted ball valve which can be repaired and maintained without being removed from the associated piping system.

Other and further objects, features and advantages of the invention will be apparent from the following description of the invention.

The invention will now be described in detail in connection with an illustrative embodiment thereof shown in the accompanying drawings, in which:

FIG. 1 is a longitudinal sectional view, partly schematic, of a trunnion mounted ball valve embodying the invention;

FIG. 2 is a top plan view, partly schematic, of the valve shown in FIG. 1;

FIG. 13 is a front elevational view of the lower seat retractor of FIG. 1;

FIG. 14 is a top plan view of the retractor of FIG. 13;

FIG. 15 is a longitudinal sectional view of the upper seat retractor of FIG. 16;

FIG. 16 is a top plan view of the retractor of FIG. 15;

FIG. 16A shows a modification of the cam construction of FIG. 16;

FIG. 17 is a top plan view of the valve operating handle of FIG. 1;

Figure 5:
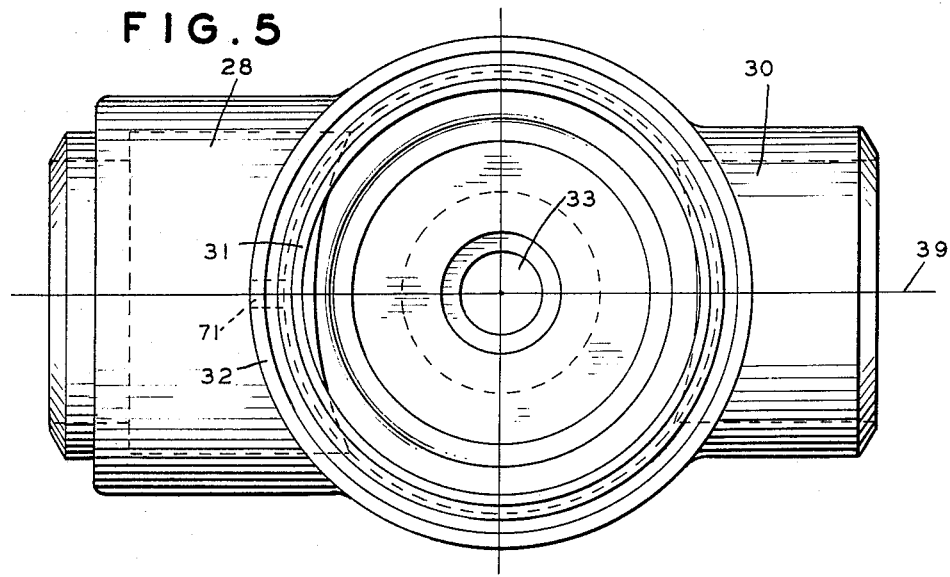
FIG. 5 is a top plan view of the valve body of FIG. 4.
Figure 4:
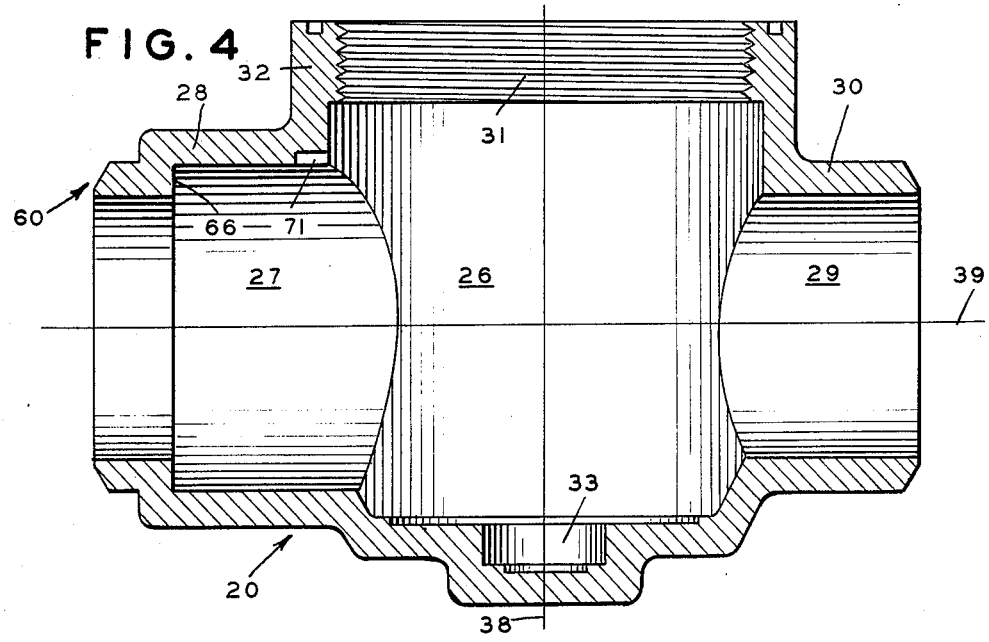
FIG. 4 is a longitudinal sectional view of the valve body of FIG. 1.
Figure 7:
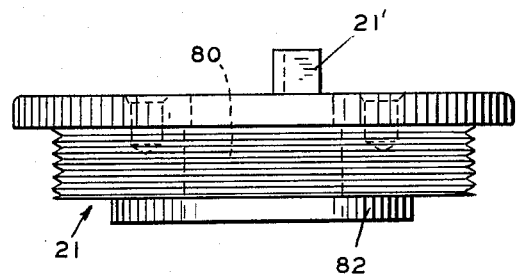
FIG. 7 is a side elevational view of the valve bonnet of FIG. 6.
Figure 6:
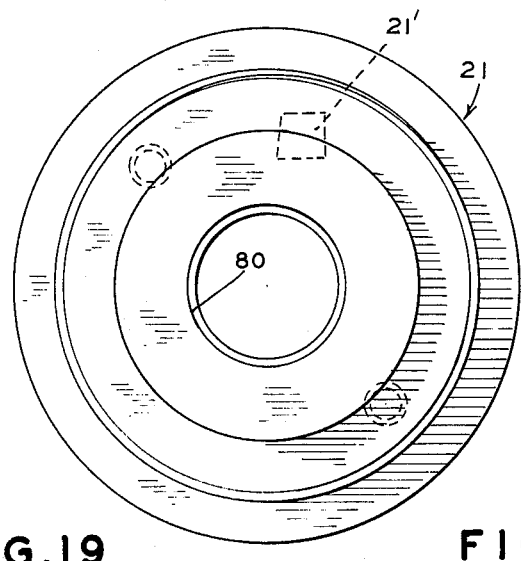
FIG. 6 is a bottom plan view of the valve bonnet of FIG. 1.
Figure 10:
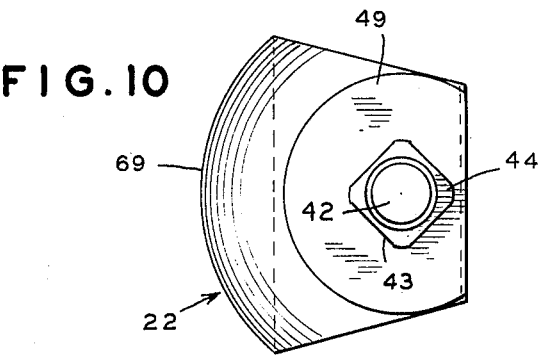
FIG. 10 is a top plan view of the ball of FIG. 8.
Figure 8:
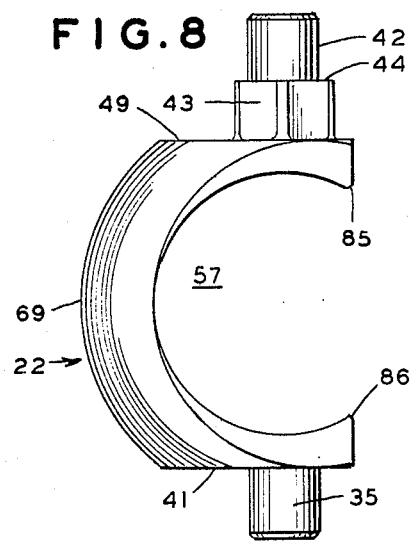
FIG. 8 is a front elevational view of the ball of FIG. 1.
Figure 9:
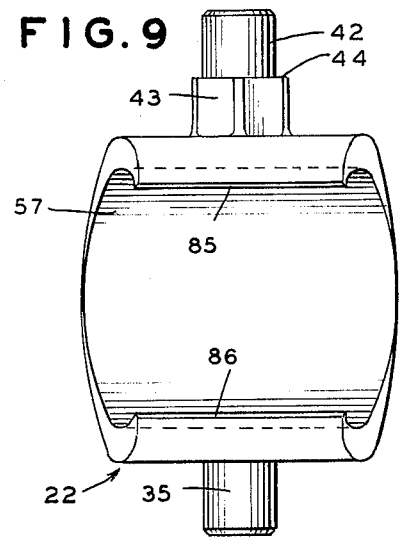
FIG. 9 is a side elevational view of the ball of FIG. 8.
Figure 12:
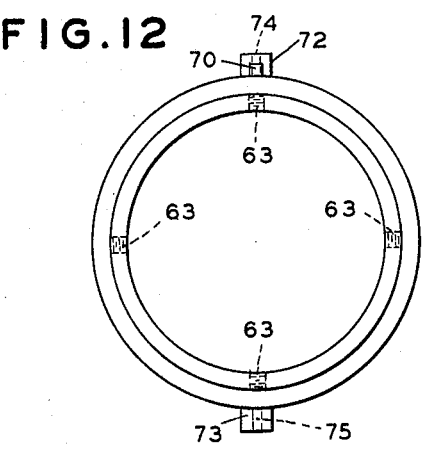
FIG. 12 is an end elevational view of the seat of FIG. 11.
Figure 11:
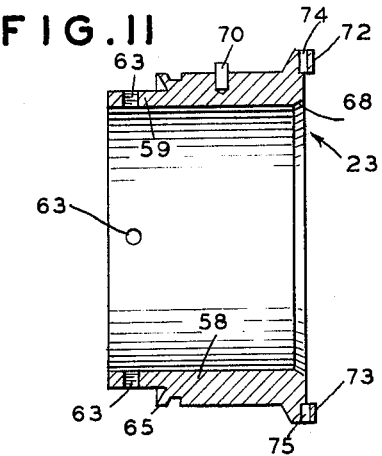
FIG. 11 is a longitudinal sectional view of the valve seat seal of FIG. 1.

Referring now to the drawings, the valve comprises a valve body 20, shown in detail in FIGS. 4 and 5, a valve bonnet 21, shown in detail in FIGS. 6 and 7, a ball 22, shown in detail in FIGS. 8, 9 and 10, an axially movable seat seal 23, shown in detail in FIGS. 11 and 12, a lower seat retractor 24, shown in detail in FIGS. 13 and 14, and an upper seat retractor 25, shown in detail in FIGS. 15 and 16.

Valve body 20 has a central chamber 26 (FIG. 4) communicating at one side with a cylindrical upstream fluid passage or port 27 defined by an annular portion 28 of the valve body. Central chamber 26 communicates at the other side with a cylindrical downstream fluid passage or port 29 defined by annular portion 30 of the valve body. Annular portions 28 and 30 may be coupled to a piping system in any convenient manner.

Central chamber 26 communicates at its upper end with a cylindrical opening 31 defined by annular portion 32 of the valve body. The top of opening 31 is closed by valve bonnet 21. Central chamber 26 communicates at its lower end with a cylindrical recess 33 in the valve body. Recess 33 accommodates an annular bushing 34 which acts as the bearing for a cylindrical stub shaft or trunnion 35 projecting from the lower end of ball 22.

Bushing 34 and trunnion 35 extend through a circular aperture 36 in a cam plate 37 forming the base of lower seat retractor 24. Bushing 34, trunnion 35 and aperture 36 are coaxial with the valve vertical center line shown by line 38 in FIG. 4. The valve horizontal center line is shown at 39 in FIGS. 1, 4 and 5. Upper surface 40 of cam 37 contacts a horizontal shoulder 41 at the bottom of ball 22.

A trunnion 42 projects from the upper end of ball 22. As best shown in FIGS. 8–10, the upper portion of trunnion 42 is cylindrical in shape, while the lower portion 43 thereof is squared. The upper and lower portions of trunnion 42 are separated by a horizontal shoulder 44.

Trunnion 42 fits within a central opening 45 of upper retractor 25. The upper part of opening 45 is cylindrical to accommodate the upper end of trunnion 42, while the lower part of opening 45 is squared, as shown at 46, to accommodate squared portion 43 of trunnion 42. Opening 45 of retractor 25 is closed at the top by a cylindrical upper portion or cover 47.

For reasons to be explained below, the square cavity 46 is slightly larger than corresponding squared portion 43 of trunnion 42. Thus, some relative motion in a horizontal plane is permitted between upper retractor 25 and trunnion 42.

A cam plate 48 forming the base of upper retractor 25 rests on a shoulder 49 formed at the top of ball 22. An arcuate upstanding connecting bar 50, which is integral with cam 37 of lower retractor 24, is bolted to upper retractor 25 by means of bolts acting in threaded holes 51 in bar 50 and corresponding aligned holes 52 in cam plate 48. Hence, the lower and upper retractors are rigidly connected together whereby rotational motion imparted to the upper retractor cam plate 48 is likewise imparted to the cam plate 37 of the lower retractor.

A valve operating handle 53 is attached to cover 47 of upper retractor 25 by means of bolts 54 acting in holes 55 in a circular portion of handle 53 and in corresponding threaded holes 56 in cover 47. Handle 53 is shown in three positions in FIG. 2, designated 53, 53A and 53B, respectively. The position designated 53 is shown in full lines and the other positions in dotted lines.

In the solid line position of handle 53, which corresponds to the position thereof shown in FIG. 1, the valve is fully closed, i.e., the ball 22 is in sealing contact with seat 23 and fluid passage or port 57 of ball 22 is completely out of communication with upstream port 27.

Figure 19:
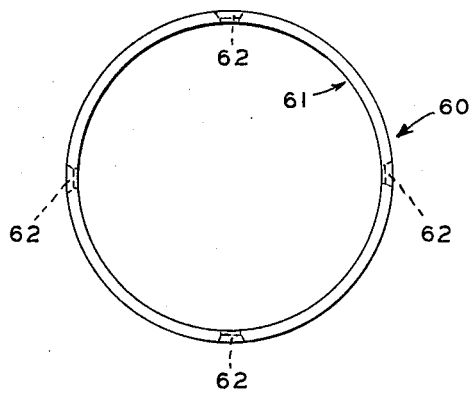
FIG. 19 is an end elevational view of the follower of FIG. 18.
Figure 18:
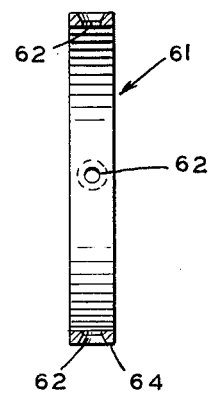
FIG. 18 is a longitudinal sectional view of the seat seal follower of FIG. 1.

Valve seat 23 is generally cylindrical in shape and has a main or body portion 58 and an outer portion 59. The internal diameters of the portions 58 and 59 are equal to each other and are also equal to the internal diameter of an upstream annular flange 60 at one end of the valve body, the internal diameter of downstream port 29 and the internal diameter of ball port 57. The outer diameter of portion 58 is slightly less than the internal diameter of annular portion 28. Preferably, there is a clearance of the order of .002–.003" between the outer surface of portion 58 and the surface of portion 28, as shown in the enlarged detail view of FIG. 3. The outer diameter of portion 59 of seat 23 is less than the outer diameter of portion 58 thereby to accommodate an annular seat seal follower element 61 (FIGS. 3, 18 and 19) which fits over portion 59 of seat seal 23 and is attached thereto by means of set screws 89 acting in holes 62 in follower 61 and aligned threaded holes 63 in portion 59. The axial length of follower 61 is less than the axial length of portion 59, thereby leaving sufficient space for the installation of a suitable sealing means such as O-ring 90.

Figure 3:
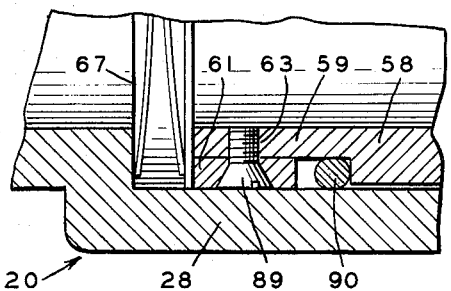
FIG. 3 is an enlarged detail view of a portion of FIG. 1 showing the relationship between the outer end of the valve seat and the valve body.

The use of a follower 61 as shown in FIG. 3 is not required if the seat 23 is constructed with a shoulder 65 as shown in FIG. 11. Shoulder 65, as shown in FIG. 11, is formed as an inclined annular flange the outer end of which is arranged to be in surface contact with the inner diameter of portion 28 of the valve body. Shoulder 65 is made thin so that it flexes as a spring and thus affords sealing contact with the valve body, the sealing pressure between shoulder 65 and the valve body being directly proportional to the internal fluid pressure in upstream port 27.

The inner end of valve body flange 60 is formed as a vertical annular shoulder 66 (FIG. 4) within which is seated an annular wave spring 67. The outer end of wave spring 67 contacts shoulder 66 and the inner end contacts seat seal follower 60. The action of wave spring 67 is to urge the seat seal follower 60 and hence also the seat seal 23 to move axially inwardly whereby the inner end of seat seal 23 is constantly urged to contact ball 22.

The inner end of seat seal 23 is formed as an inclined shoulder 68 against which the outer unrelieved surface 69 of ball 22 makes sealing contact in valve closed position. If desired, the shoulder 68 may be extended so as to provide a larger sealing area in contact with ball surface 69. Various configurations can be used for the seat seal sealing surface instead of the simple inclined shoulder shown. For example, a flexible lip may be provided for sealing contact with the ball. If desired, the actual sealing surface of the seal 23 may be in the form of an annular insert affixed in a recess in the seal 23 by welding or other bonding means.

Seat 23 is provided with a lug or key 70 (FIG. 11) which projects radially outwardly of the portion 58 and is accommodated by a corresponding groove or keyway 71 in valve body portion 28. The key 70 acting in keyway 71 insures proper alignment of the seat seal 23 when the latter is inserted in port 27 and prevents rotation of the seal 23.

Lugs 72 and 73 project axially inwardly and radially outwardly from the top and bottom, respectively, of the inner end of seat seal 23. The inner ends of lugs 72 and 73 are narrow, as shown at 74 and 75, respectively, in FIG. 12, and are adapted to be contacted by the vertical cam faces of upper and lower retractor cams 48 and 37, respectively. The retractors 24 and 25 are aligned so that the ends of lugs 72 and 73 are aligned with the centers of cam flats 76 and 77, respectively, when the valve is in fully closed position. The lugs 72 and 73 may be replaced with a corresponding annular flange, in which event rotation of the seal 23 may be permitted and key 70 may be omitted. The seal 23, as shown in FIG. 2, is provided with the annular flange construction.

It will be evident that rotation of the retractor cams 48 and 36, which occurs when the valve handle 53 is moved from the valve closed position shown in solid lines in FIG. 2, will cause the lugs 72 and 73 and hence the seat seal 23 to move axially outwardly because the radius of the cam surfaces is greater for all curved portions of the cam than the effective radius thereof at any point along flats 76 and 77. Lugs 72 and 73 thus act as cam followers. If desired, the flats 76 and 77 can be replaced with notches, as shown at 76 in FIG. 16A, providing a more abrupt camming action.

The depths and positions of the operating flats 76 and 77 are selected so that with the handle 53 in the valve closed position the wave spring 67 can force the seal 23 into full sealing contact with the ball. For this purpose, and to accommodate wear, it is preferable that the lugs not contact the flats in the valve fully closed position, and that the flats not contact the lugs within a short arc of lost motion, e.g., 5°, of the fully closed position. But as the handle 53 is rotated toward the valve open position thereof and beyond the short lost motion arc, rotation of the cams 48 and 37 forces the seal 23 to move axially outwardly and hence out of contact with the ball surface. The wave spring 67 opposes such outward motion of the seal 23. The difference between the cam radius in the portions of the flats 76 and 77 corresponding to the valve fully closed position and the cam radius in the circular portions of the cams corresponds approximately to the axial distance through which the seal 23 will be moved by rotation of the retractor cams. A slight difference will exist because of the arc of rotation required before the flats contact the lugs to move the seat seal 23. The cams 37 and 48 should correspond in configuration and positioning so that the seal 23 is not subjected to twisting or cocking motion but only to axial travel.

As mentioned previously, slack exists between the squared portion 43 of trunnion 42 and the squared portion 46 of socket 45. This slack is selected so that, as handle 53 is moved from the fully closed position thereof to the position designated 53A in FIG 2, no rotational motion will be imparted to the trunnion 42 and hence the ball 22 will not be rotated. However, in moving handle 53 to the position 53A, the cams 48 and 37 will be rotated through a predetermined arc, which is sufficient for the camming action to move the seal 23 out of contact with the ball. In moving the valve operating handle from position 53A to the fully open position designated 53B, contact between the squared walls 46 of socket 45 and the squared surfaces 43 of trunnion 42 forces the ball to rotate through an arc of approximately 90°. Hence the ball moves from a position in which ball port 57 is completely out of alignment with upstream port 27 to a position in which ball port 57 is in alignment with the upstream and downstream valve ports, thus affording an unobstructed passage for fluid flow between the upstream and downstream ports. The arcuate travel of handle 53 will be slightly greater than the arcuate travel of the ball by reason of the initial lost motion used for retracting seat seal 23 out of contact with the ball.

Rotational motion of the retractors and ball is afforded without the upper ball trunnion 42 extending outwardly through the bonnet. This is easily observed from FIGS. 1 and 15. Hence, if there be any clearance between the upper and lower horizontal ball surfaces 49 and 41 and the adjacent horizontal cam surfaces, the action of fluid pressure will be equalized at the top and bottom of the ball and therefore the ball will not move vertically relative to the seat 23 under action of fluid pressure. This pressure equalization would not be obtained if the ball upper trunnion extended outwardly of the bonnet, since it would then be necessary to provide a seal such as an O-ring preventing leakage past the upper trunnion.

As shown in FIG. 1, the cylindrical body portion 78 of upper retractor 25 is accommodated by a bushing 79 which is held in a central aperture 80 in bonnet 21 and acts as a bearing. Bushings 79 and 34 are aligned and cooperate in maintaining the ball in vertical position relative to the valve axial center line. Bushing 79 has an outwardly extending annular flange 81 which acts as a bearing surface between upper retractor cam 48 and an annular downwardly extending projection 82 of bonnet 21.

Bonnet 21 is preferably bolted to the valve body but may be in threaded engagement therewith. Sealing means, such as O-ring seals, are provided to prevent leakage between the valve body and bonnet, as shown at 83, and between the upper retractor and valve bonnet, as shown at 84.

One end of handle 53 is provided with a stop lug 53′ which contacts a stop 21′ on valve bonnet 21 and hence serves to limit rotation of the handle 53 in the valve open direction.

As mentioned above, in moving the valve operating handle 53 (or other valve operating mechanism) from the fully closed position toward the fully open position, lost motion between the upper retractor socket and the ball upper trunnion permits the valve seat 23 to be retracted out of contact with the ball before the ball starts to turn. When turning the handle 53 in the other direction, i.e., toward the valve closed position, this lost motion again ocurs at the start of the turning. Hence, when the ball approaches the valve fully closed position, the lugs 72 and 73 contact the cam flats 76 and 77, respectively, before the ball reaches the fully closed position. As a result, the seal 23 is allowed to be in contact with the ball for a few degrees of ball rotation. This contact causes the sealing surfaces to be wiped clean before sealing actually occurs.

As best shown in FIGS. 1, 8 and 9, a major portion of the side of ball 22 opposite sealing surface 69 is cut away. The cut-away portion of the ball wall extends from a shoulder 85 to a shoulder 86. Any part of the ball can be cut away except those portions needed to make sealing contact with the seat seal 23, but, in general, it is desirable to cut away no more than necessary to facilitate valve assembly and disassembly.

The upper retractor cam 48 is cut away at 87 and the lower retractor cam 37 is cut away at 88, as shown in FIGS. 16 and 14, respectively. The cut-away portions 87 and 88 correspond in position to the cut-away portion of the ball between shoulders 85 and 86 and are likewise provided to facilitate valve assembly and disassembly.

In assembling the valve, the bonnet 21 is removed and the wave spring 67 is inserted into the valve body through the bonnet opening and is installed in its socket in the upstream valve port 27. The preassembled seat seal 23 and seat seal follower 61 are then inserted into the valve body through the bonnet opening and are installed in the upstream valve port. The lower trunnion bushing 34 is inserted into recess 33 in the valve body.

The subassembly formed by the lower retractor, the ball and the upper retractor is assembled, and this subassembly is inserted into the valve body through the bonnet opening, and lower trunnion 35 is seated in bushing 34. In order to permit insertion of the subassembly, the upper and lower retractor and the ball are positioned with the cutaway portions 87, 88 and 85-86 facing the seat seal. This corresponds to a ball position beyond the fully closed position.

With the retractors and ball in place, the upper bushing 79 is installed, the valve bonnet is positioned to close the valve bonnet opening and is affixed to the valve body, and the handle 53 (or other operating mechanism) is attached to the upper retractor cover. The handle 53 is turned to the fully closed position and the valve is ready to be operated as described above.

Disassembly of the valve is effected by performing these steps in the reverse order. It will be observed that both assembly and disassembly require only insertion or removal of parts through the bonnet opening. Hence, assembly and disassembly can be effected without removing the valve from its piping system.

The connecting bar 50, which connects the upper and lower retractors, is preferably shaped, as shown, to conform to the removed portion of the ball between shoulders 85 and 86. In this way the orifice for flow formed by the ball and connecting bar will be circular in shape and hence will reduce turbulence.

The trunnion driving connection may be accomplished as shown; however, it may be accomplished where the ball upper trunnion is used for bearing purposes only and the driving connection between the ball and the retractors is achieved by designing arcuate bar 50 to contact positions 85 and 86 of the ball, the clearance therebetween providing the requisite lost motion.

While the invention has been described in connection with specific embodiments thereof and in a specific use, various modifications thereof will occur to those skilled in the art without departing from the spirit and scope of the invention as set forth in the appended claims.

What is claimed is:

1. A trunnion mounted ball valve, comprising a valve body having a central cavity, a generally cylindrical inlet port communicating with one side of said cavity, an outlet port communicating with the other side of said cavity, an annular seat seal mounted in said inlet port and being axially slidable therein, said seat seal having a sealing face concentric with said inlet port and projecting into said cavity, a ball element in said cavity, said ball having upper and lower axially aligned trunnions, bearing means in said valve body for receiving said lower trunnion, said ball having a fluid passage arranged in one rotational position of said ball to provide fluid communication between said ports and in another rotational position of said ball to be out of fluid communication with said inlet port, a spring element mounted in said inlet port and arranged to urge said seat seal to move axially toward said ball whereby said sealing face comes into sealing contact with a sealing surface of said ball when said ball is in said other rotational position thereof, driving means to rotate said ball between said positions thereof, and cam means separate from and operated by said driving means and arranged to contact said seat seal and to move said seat seal out of contact with said ball when said driving means is actuated to move said ball from said second toward said first position thereof and to retain said seat seal out of contact with said ball except when said ball approaches said second position thereof when being rotated toward said second position thereof, said driving means affording lost motion in rotating said ball whereby said cam means moves said seat seal out of contact with said ball before said driving means commences to rotate said ball from said second position thereof.

2. A trunnion mounted ball valve, comprising a valve body having a central cavity, a generally cylindrical inlet port communicating with one side of said cavity, an outlet port communicating with the other side of said cavity, said valve body having a bonnet opening communicating with the top of said cavity, a removable bonnet closing said bonnet opening and having an aperture therein, an annular seat seal mounted in said inlet port and being axially slidable therein, said seat seal having a follower face projecting into said cavity and having a sealing face concentric with said inlet port and projecting into said cavity, a ball element in said cavity, said ball having upper and lower axially aligned trunnions, first bearing means in said valve body for receiving said lower trunnion, second bearings means carried in said aperture in said bonnet and arranged to receive said upper trunnion, said ball having a fluid passage arranged in one rotational position of said ball to provide fluid communication between said ports and in another rotational position of said ball to be out of fluid communication with said inlet port, an annular spring mounted in said inlet port and arranged to urge said seat seal to move axially toward said ball whereby said sealing face comes into sealing contact with a sealing surface of said ball when said ball is in said other rotational position thereof, driving means to rotate said ball between said positions thereof, and cam means separate from and operated by said driving means and arranged to move said seat seal out of contact with said ball when said driving means is actuated to rotate said ball from said second toward said first position thereof, said driving means affording lost motion in rotating said ball whereby said cam means moves said seat seal out of contact with said ball before said driving means commences to rotate said ball from said second position thereof.

3. A trunnion mounted ball valve as set forth in claim 2 in which said ball and said seat seal are made of metal and in which a portion of said ball remote from said sealing surface is removed to permit said ball to be inserted into and removed from said cavity through said bonnet opening.

4. A trunnion mounted ball valve, comprising a valve body having a central cavity, a generally cylindrical inlet port communicating with one side of said cavity, an outlet port communicating with the other side of said cavity, said valve body having a bonnet opening communicating with the top of said cavity, a removable bonnet closing said bonnet opening and having an aperture therein, an annular seat seal mounted in said inlet port and being axially slidable therein, said seat seal having a sealing face concentric with said inlet port and projecting into said cavity, a ball element in said cavity, said ball having upper and lower axially aligned trunnions, bearing means in said valve body for receiving said lower trunnion, said ball having a fluid passage arranged in one rotational position of said ball to provide fluid communication between said ports and in another rotational position of said ball to be out of fluid communication with said inlet port, an annular spring mounted in said inlet port and arranged to urge said seat seal to move axially toward said ball whereby said sealing face comes into sealing contact with a sealing surface of said ball when said ball is in said other rotational position thereof, upper and lower cam elements in said cavity and being pivotable with said ball and about the axis of said trunnions, said cam elements having cam faces contacting said seat seal and forcing said seat seal out of sealing contact with said ball except when said cam elements are in a rotational position thereof corresponding substantially to said other position of said ball, means intercoupling said cam elements and said ball in driving relationship, said last mentioned means affording lost motion permitting said cam elements to move said seat seal out of contact with said ball before starting to move said ball from said other position thereof and permitting said cam elements to allow said seat seal to contact said ball prior to said ball entering said other position thereof, and externally operable means for pivoting said cam elements.

5. A trunnion mounted ball valve, comprising a valve body having a central cavity, a generally cylindrical inlet port communicating with one side of said cavity, an outlet port communicating with the other side of said cavity, said valve body having a bonnet opening communicating with the top of said cavity, a removable bonnet closing said bonnet opening and having an aperture therein, an annular seat seal mounted in said inlet port and being axially slidable therein, said seat seal having a follower face projecting into said cavity and having a sealing face concentric with said inlet port and projecting into said cavity, a ball element in said cavity, said ball having upper and lower axially aligned trunnions, first bearing means in said valve body for receiving said lower trunnion, second bearing means in said aperture in said bonnet, an upper retractor pivotally mounted in said second bearing means, a lower retractor pivotally mounted on said first bearing means, each of said retractors having a cam element pivotable about the axis of said trunnions and having a cam face arranged to contact said follower face, means interconnecting said retractors whereby rotational motion imparted to said upper retractor produces corresponding rotational motion of said lower retractor, said upper retractor having a socket arranged to receive said upper trunnion and having a driving configuration relative to said upper trunnion, said driving configuration of said socket affording a minor amount of lost motion relative to said upper trunnion, said ball having a fluid passage arranged in one rotational position of said ball to provide fluid communication between said ports and in another rotational position of said ball to be out of fluid communication with said inlet port, a spring mounted in said inlet port and arranged to urge said seat seal to move axially toward said ball whereby said sealing face comes into sealing contact with a sealing surface of said ball when said ball is in said other rotational position thereof, each of said cam faces having a configuration permitting said sealing face to contact said sealing surface of said ball when said ball is in said other rotational position thereof but moving said seat seal axially away from said ball upon pivoting of said cam elements away from positions thereof corresponding to said other rotational position of said ball, said lost motion between said socket and said upper trunnion being sufficient for rotation of said cam elements to retract said seat seal out of contact with said ball sealing surface before rotation of said ball away from said second rotational position is produced by said driving contact, and externally operable actuating means for pivoting said upper retractor thereby to rotate said cam elements and said ball.

6. A ball valve as set forth in claim 5 in which said lost motion permits said seat seal to contact said ball sealing surface before said ball reaches said other rotational position thereof when being rotated in the direction of said other rotational position.

7. A ball valve as set forth in claim 5 in which said cam faces are generally circular in configuration except for flat portions located in positions corresponding to said other rotational position of said ball.

8. A ball valve as set forth in claim 5 in which said cam faces are generally circular in configuration except for notches located in positions corresponding to said other rotational position of said ball.

9. A trunnion mounted ball valve, comprising a valve body having a central cavity, a generally cylindrical inlet port communicating with one side of said cavity, an outlet port communicating with the other side of said cavity, said valve body having a bonnet opening communicating with the top of said cavity, a removable bonnet closing said bonnet opening and having an aperture therein, an annular seat seal mounted in said inlet port and being axially slidable therein, said seat seal having a follower face projecting into said cavity and having a sealing face concentric with said inlet port and projecting into said cavity, a ball element in said cavity, said ball having upper and lower axially aligned trunnions, first bearing means in said valve body for receiving said lower trunnion, second bearing means in said aperture in said bonnet, an upper retractor pivotally mounted in said second bearing means, a lower retractor pivotally mounted on said first bearing means, each of said retractors having a cam element pivotable about the axis of said trunnions and having a cam face arranged to contact said follower face, each of said cam elements having a flat face arranged to contact a corresponding flat face of said ball and each of said cam elements having a central opening through which a respective one of said trunnions projects, means interconnecting said retractors whereby rotational motion imparted to said upper retractor produces corresponding rotational motion of said lower retractor, said upper retractor having a socket arranged to receive said upper trunnion and having a driving configuration relative to said upper trunnion, said driving configuration of said socket affording a minor amount of lost motion relative to said upper trunnion, said ball having a fluid passage arranged in one rotational position of said ball to provide fluid communication between said ports and in another rotational position of said ball to be out of fluid communication with said inlet port, an annular wave spring mounted in said inlet port and arranged to urge said seat seal to move axially toward said ball whereby said sealing face comes into sealing contact with a sealing surface of said ball when said ball is in said other rotational position thereof, each of said cam faces having a configuration permitting said sealing face to contact said sealing surface of said ball when said ball is in said other rotational position thereof but moving said seat seal axially away from said ball upon pivoting of said cam elements away from positions thereof corresponding to said other rotational position of said ball, said lost motion between said socket and said upper trunnion being sufficient for rotation of said cam elements to retract said seat seal out of contact with said ball sealing surface before rotation of said ball is produced by said driving contact, and externally operable actuating means for pivoting said upper retractor thereby to rotate said cam elements and said ball, said ball having a portion of the surface thereof remote from said sealing surface removed to permit said ball and said retractors to be inserted into and removed from said bonnet opening as a unit.

10. A ball valve as set forth in claim 9 in which said means interconnecting said retractors is shaped generally as a spherical segment corresponding in shape and location to a part of said removed surface of said ball, said spherical segment forming a part of said fluid passage.

References Cited by the Examiner
UNITED STATES PATENTS

| | | | |
|---|---|---|---|
| 301,282 | 7/1884 | Rohney | 251—203 |
| 2,661,926 | 12/1953 | Resek | 251—174 X |
| 2,718,372 | 9/1955 | Broz | 251—174 |
| 2,839,074 | 6/1958 | Kaiser | 251—315 X |
| 2,883,146 | 4/1959 | Knox | 251—315 X |
| 3,045,693 | 7/1962 | Allen | 251—315 X |

ISADOR WEIL, *Primary Examiner.*

CLARENCE R. GORDON, *Examiner.*